United States Defensive Publication [19] (H) [11] T958,004

Crane et al. [43] May 3, 1977

[54] HOT-MELT ADHESIVE, AND WOOD COMPOSITE STRUCTURES PRODUCED THEREWITH

[75] Inventors: Grant Crane; Edward Leo Kay, both of Akron, Ohio

[73] Assignee: The Firestone Tire & Rubber Company, Akron, Ohio

[21] Appl. No.: 717,842

[22] Filed: Aug. 26, 1976

Related U.S. Application Data

[63] Continuation of Ser. No. 484,524, July 1, 1974, abandoned.

[51] Int. Cl.[2] ..... C08J 11/00; C08C 19/08

[52] U.S. Cl. ..... 260/2.3; 152/357 A; 260/3; 260/32.8 A; 260/33.6 AQ; 260/719; 260/729; 260/732; 260/733; 260/887

[57] ABSTRACT

A hot-melt adhesive is shown which contains 75 to 99 parts by weight of depolymerized scrap rubber. From 1 to 25 parts by weight of an additive are included. The additive can include an elastomer, a resin, or a filler, or any combination thereof. The depolymerized scrap rubber is produced by heating solid scrap rubber in contact with a hydrocarbon liquid at 400° to 800° F. for 0.1 to 50 hours.

In use, the adhesive is heated and combined with two or more wood elements. When the combination cools, a composite wood structure is obtained.

No Claims, No Sheets Drawing,

25 Pages Specification

The file of this unexamined application may be inspected and copies thereof may be purchased (849 O.G. 1221, Apr. 9, 1968).